(12) United States Patent
Chen (10) Patent No.: US 7,267,358 B2
(45) Date of Patent: Sep. 11, 2007

(54) FOLDABLE FRAME WITH A LOCKING DEVICE

(75) Inventor: Shun-Min Chen, Taipei (TW)

(73) Assignee: Wonderland Nurserygoods Co, Ltd., Taipei (TW)

( * ) Notice: Subject to any disclaimer, the term of this patent is extended or adjusted under 35 U.S.C. 154(b) by 314 days.

(21) Appl. No.: 10/972,330

(22) Filed: Oct. 26, 2004

(65) Prior Publication Data

US 2006/0088368 A1 Apr. 27, 2006

(51) Int. Cl.
*B62B 7/00* (2006.01)

(52) U.S. Cl. ........................ 280/642; 280/646

(58) Field of Classification Search .............. 280/638, 280/639, 38, 39, 641, 642, 646
See application file for complete search history.

(56) References Cited

U.S. PATENT DOCUMENTS

| | | | | |
|---|---|---|---|---|
| 1,785,342 A | * | 12/1930 | Gilbert | .......... 403/100 |
| 2,467,579 A | * | 4/1949 | Boudreau | .......... 403/100 |
| 3,563,592 A | * | 2/1971 | Preston | .......... 292/263 |
| 4,765,645 A | | 8/1988 | Shamie | |
| 5,226,658 A | | 7/1993 | Huang | |
| 5,288,098 A | * | 2/1994 | Shamie | .......... 280/642 |
| 5,845,925 A | | 12/1998 | Huang | |
| 6,422,586 B1 | | 7/2002 | Glover | |
| 6,561,536 B2 | * | 5/2003 | Suzuki | .......... 280/642 |

* cited by examiner

*Primary Examiner*—Christopher P. Ellis
*Assistant Examiner*—Brian Swenson
(74) *Attorney, Agent, or Firm*—Pearl Cohen Zedek Latzer LLP (57) ABSTRACT

A foldable frame includes spaced-apart first and second support rods, a first bar having a first end connected pivotally to the first support rod, a second bar having first and second ends connected pivotally and respectively to the second support rod and a second end of the first bar, a sleeve disposed slidably around the first bar and movable to a juncture of the first and second bars when the bars are unfolded so as to limit relative movement between the first and second bars, and a control unit having a cable connected to the sleeve for pulling the sleeve away from the juncture of the first and second bars so that the first and second bars can be folded.

18 Claims, 6 Drawing Sheets

FOLDABLE FRAME WITH A LOCKING DEVICE

BACKGROUND OF THE INVENTION

1. Field of the Invention

The invention relates to a foldable frame, more particularly to a foldable frame with a locking device that can prevent inadvertent folding of the frame and that can be easily and safely operated so as to facilitate folding and unfolding of the frame.

2. Description of the Related Art

A plurality of locking units have been developed to facilitate folding and unfolding of a frame body, such as that used for a table, a chair, an infant stroller, etc.

In each of U.S. Pat. Nos. 4,765,645, 5,226,658, 5,845,925, and 6,422,586, there is disclosed a locking unit for a stroller. Each of the different constructions of the aforementioned locking units is complicated, unreliable, and even unsafe to use. Thus, there is a need to provide a foldable frame with a locking device which has a more simple and reliable structure.

SUMMARY OF THE INVENTION

Therefore, the object of the present invention is to provide a foldable frame with a locking device that is convenient and safe to use, and effective in operation.

Another object of the present invention is to provide a foldable frame with a locking device that can prevent inadvertent folding of the frame.

A further object of the present invention is to provide a stroller which is safe and convenient to use.

According to one aspect of this invention, a foldable frame comprises first and second support rods which are spaced apart from each other, a first bar having a first end connected pivotally to the first support rod and a second end opposite to the first end, a second bar having a first end connected pivotally to the second support rod and a second end connected pivotally to the second end of the first bar, a sleeve disposed slidably around the first bar, and a control unit. The first and second bars are connected pivotally to each other so as to be folded or unfolded. The sleeve is movable to a juncture of the first and second bars when the first and second bars are unfolded so as to limit relative movement between the first and second bars. The control unit has a cable connected to the sleeve for pulling the sleeve away from the juncture of the first and second bars so that the first and second bars can be folded.

According to another aspect of this invention, a locking device is adapted to be mounted on a foldable frame which has first and second support rods. The locking device comprises a first bar having a first end adapted to be connected pivotally to the first support rod and a second end opposite to the first end, a second bar having a first end adapted to be connected pivotally to the second support rod and a second end connected pivotally to the second end of the first bar, a sleeve mounted slidably on the first bar, and a control unit. The first and second bars are movable relative to each other so as to be folded or unfolded. The sleeve is sleeved slidably on the first bar, and is capable of extending toward a juncture of the first and second bars when the first and second bars are unfolded so as to limit relative movement between the first and second bars. The control unit has a manually operable cable connected to the sleeve for pulling the sleeve away from the juncture of the first and second bars so that the first and second bars can be folded.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Referring to FIGS. 1 to 4, a foldable frame 900 is shown to comprise first and second support rods 91, 92, and a pair of intersecting links 19, and incorporates a locking device 100 embodying the present invention. The foldable frame 900 exemplified in this embodiment is a foldable frame used in an infant stroller. However, the locking device of the present invention may also be used in a foldable frame for a table, a chair, a bed assembly, etc.

Figure 1:
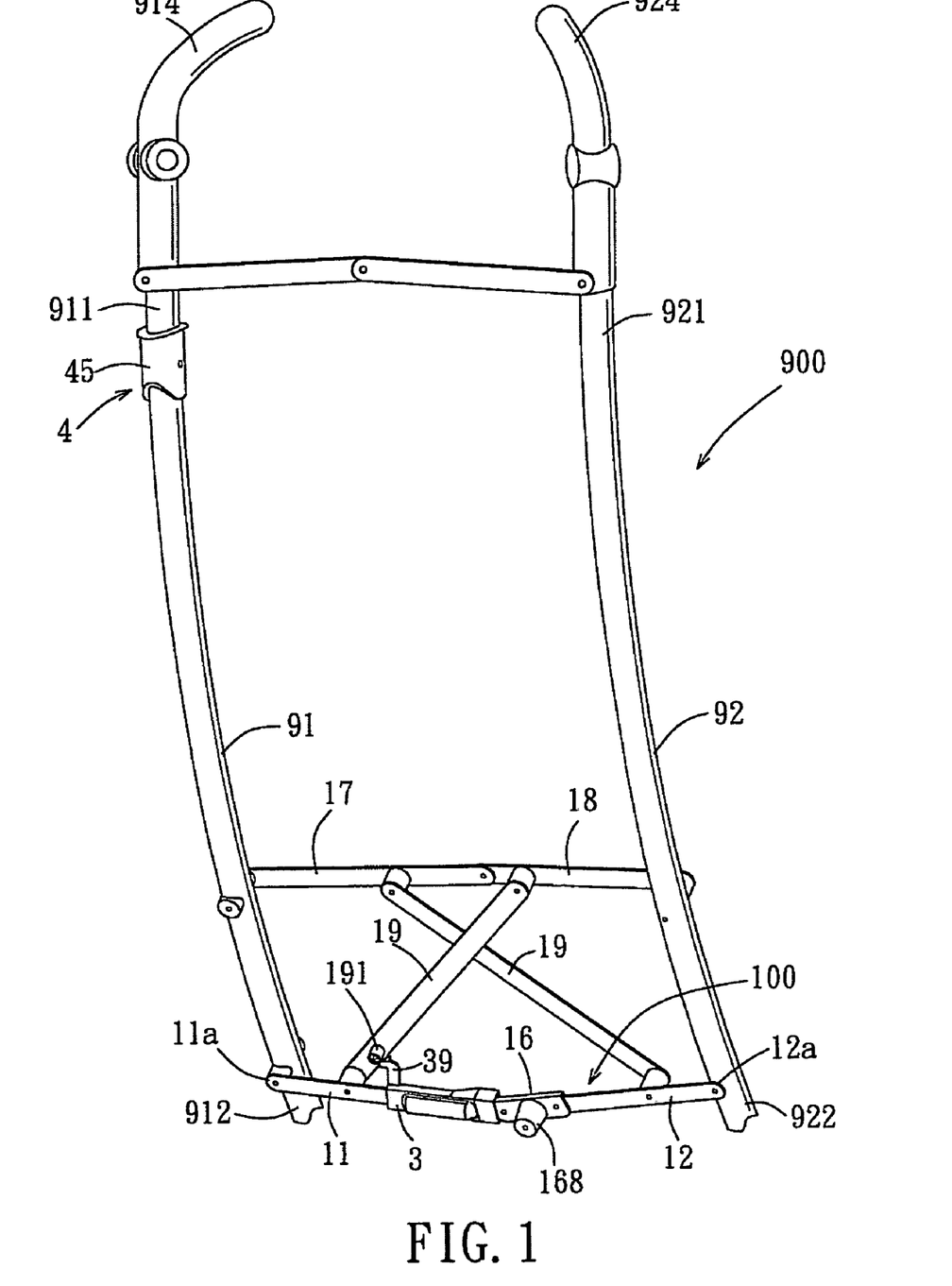
FIG. 1 is a perspective view of the preferred embodiment of a foldable frame according to the present invention.

The first and second support rods 91, 92 in this embodiment are spaced apart from and are parallel to each other. Each of the first and second support rods 91, 92 has an upper end portion 911, 921 and a lower end portion 912, 922. The upper end portion 911, 921 of each of the first and second support rods 91, 92 is provided with a handle 914, 924, whereas the lower end portion 912, 922 of each of the first and second support rods 91, 92 is connected to a wheel assembly (not shown) of the stroller. When the foldable frame 900 is unfolded, the first and second support rods 91, 92 move away from each other. When the foldable frame 900 is folded, the first and second support rods 91, 92 approach each other.

Figure 2:
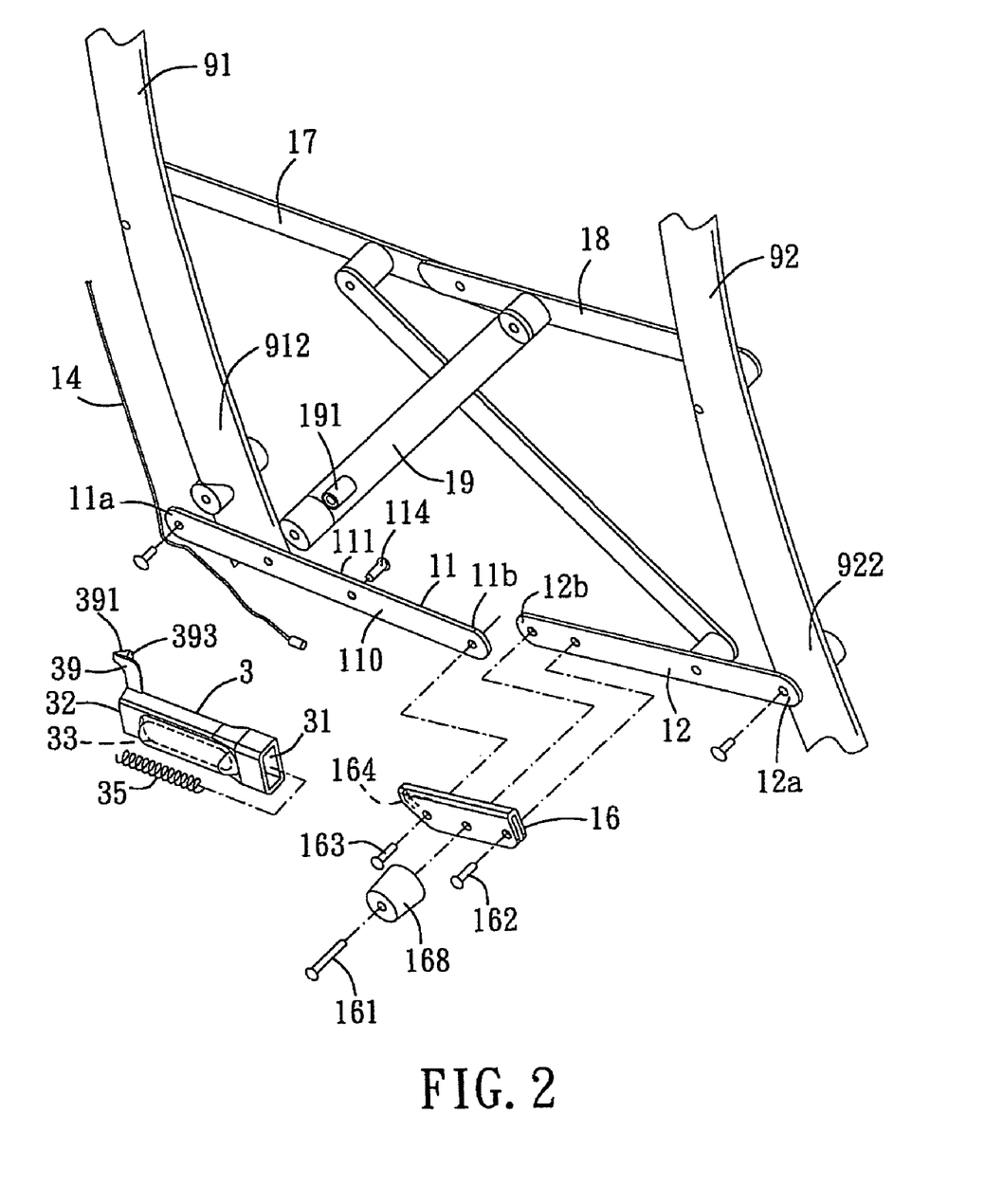
FIG. 2 is an exploded perspective view of a locking device of the preferred embodiment.
Figure 3:
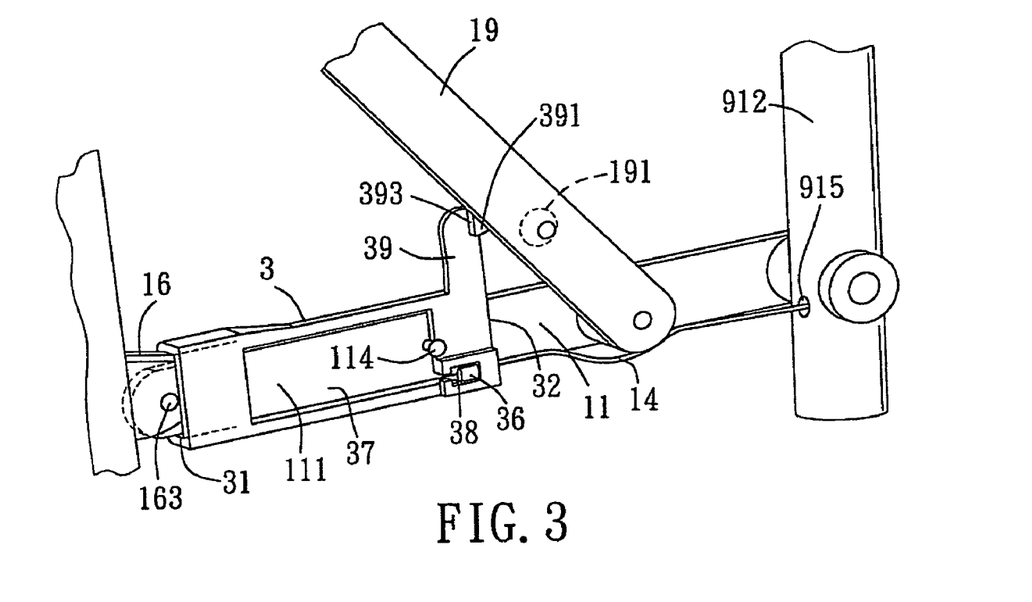
FIG. 3 is a fragmentary perspective view of the locking device in an assembled state.
Figure 4:
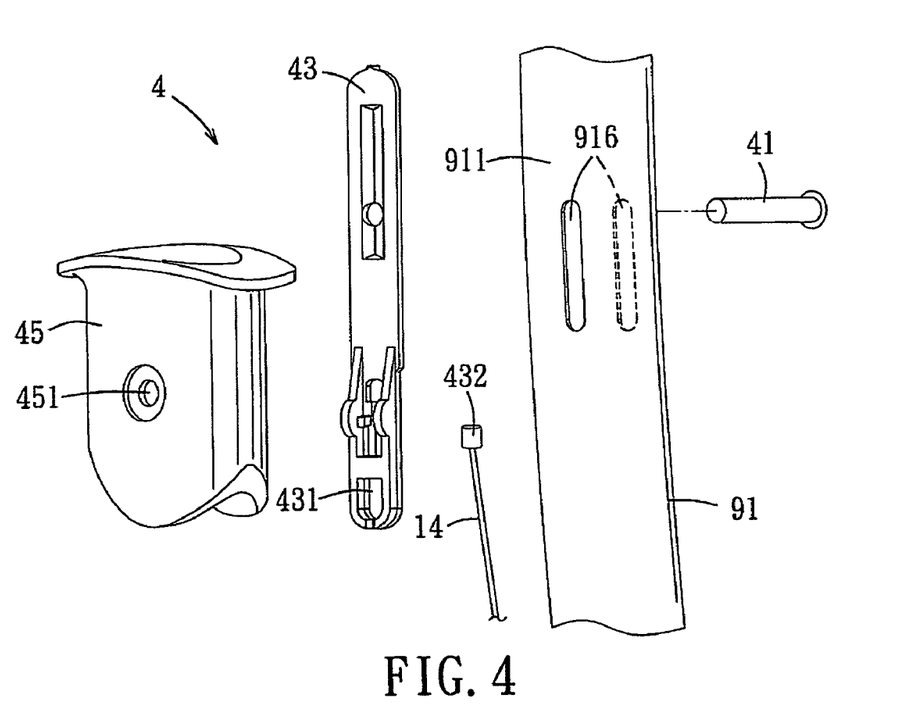
FIG. 4 is an exploded perspective view of a control unit of the locking device.

The locking device 100 includes an elongated first bar 11, an elongated second bar 12, a sleeve 3, and a control unit 4. The first bar 11 has a first end 11a connected pivotally to the lower end portion 912 of the first support rod 91, and a second end 11b opposite to the first end 11a. The second bar 12 has a first end 12a connected pivotally to the lower end portion 922 of the second support rod 92, and a second end 12b connected pivotally to the second end 11b of the first bar 11. The first and second bars 11, 12 are movable relative to each other so as to be folded or unfolded.

The second bar 12 further includes a limiting member 16 disposed on the second end 12b of the second bar 12. In this embodiment, the first and second bars 11, 12 are connected pivotally to each other through the limiting member 16. The limiting member 16 has a substantially U-shaped cross-section, and is sleeved on the second bar 12 in an inverted manner so that an inner wall face 164 of the limiting member 16 projects from the second end 12b of the second bar 12 to overlap the second end 11b of the first bar 11. The limiting member 16 has one end fixed immovably to the second bar 12 by a first pin 162, and the other end connected pivotally to the second end 11b of the first bar 11 by a second pin 163. A cylindrical pedal block 168 projects outwardly from the limiting member 16 and transversely of the second bar 12, and is fixed to the limiting member 16 by a third pin 161.

When the first and second bars 11, 12 are unfolded, the inner wall face 164 of the limiting member 16 engages the second end 11b of the first bar 11, thereby limiting relative movement between the first and second bars 11, 12.

It is noted that the limiting member 16 may be formed integrally with the second bar 12 because the limiting member 16 is not required to pivot relative to the second bar 12, in which case, the pedal block 168 may be fixed to the second bar 12 instead of the limiting member 16.

The sleeve 3 is formed as a tubular member with a rectangular cross-section, and has two opposite first and second open ends 31, 32. The sleeve 3 is disposed slidably around the first bar 11, and is movable for partial placement over a juncture of the first and second bars 11, 12 when the bars 11, 12 are unfolded so as to limit relative movement between the first and second bars 11, 12. The first open end 31 is proximate to the juncture of the first and second bars 11, 12. The sleeve 3 further includes a receiving groove 33, a biasing unit 35, and a rectangular slot 37. The receiving groove 33 faces a front surface 110 of the first bar 11, and is defined by an elongated wall projecting outwardly from a front wall of the sleeve 3 so that the front wall of the sleeve 3 is formed with an elongated protrusion.

The biasing unit 35 is disposed in the receiving groove 33, and normally biases the sleeve 3 to move toward the juncture of the first and second bars 11, 12 in the absence of an external force. In this embodiment, the biasing unit 35 is a helical spring, and has one end abutting against the wall defining the receiving groove 33, and another end connected to the first bar 11 through a fourth pin 114.

The rectangular slot 37 is formed in a rear wall of the sleeve 3 opposite to the receiving groove 33, and faces a rear surface 111 of the first bar 11. The fourth pin 114 has one end extending through the first bar 11, and the other end projecting outwardly from the slot 37. Due to the slot 37 provided in the sleeve 3, the sleeve 3 is able to freely slide along the first bar 11 without being hindered by the fourth pin 114.

The sleeve 3 further includes a first socket 38 which is provided adjacent to the second open end 32 of the sleeve 3 and distal from the second bar 12, and a first lump 36 received in the first socket 38.

The control unit 4 includes a cable 14, and a hand-operated mechanism. One end of the cable 14 is connected to the first lump 36 for pulling the sleeve 3 away from the juncture of the first and second bars 11, 12 so that the first and second bars 11, 12 can be folded. The hand-operated mechanism is mounted on the upper end portion 911 of the first support rod 91, and includes a slide plate 43, and a knob 45. The slide plate 43 is inserted into the first support rod 91, and has a second socket 431, and a second lump 432 received in the second socket 431. The cable 14 extends into the lower end portion 912 of the first support rod 91 via a through hole 915, and then extends to the upper end portion 911 of the first support rod 91 to connect with the second lump 432.

The knob 45 has a hollow cylindrical shape, and is sleeved slidably around the first support rod 91. The first support rod 91 further has a pair of aligned elongated guide slots 916 that extend substantially parallel to an axis of the first support rod 91. The slide plate 43 is connected to the knob 45 through a fifth pin 41 that passes through a hole 451 at one side of the knob 45, one of the guide slots 916, the slide plate 43, and extends out of the other one of the guide slots 916. The end of the pin 41 is fitted into the other hole 451 in the other side of the knob 45 so that the knob 45 can move along the guide slots 916. When the knob 45 is moved, the slide plate 43 and the cable 14 move in unison with the knob 45.

A third bar 17 and a fourth bar 18 are provided above the first and second bars 11, 12 in this embodiment. Each of the third and fourth bars 17, 18 has one end connected pivotally to each other, and another end connected pivotally to a respective one of the first and second support rods 91, 92.

The intersecting links 19 are pivoted to each other between the first and second support rods 91, 92. Each of the intersecting links 19 has one end connected pivotally to one of the first and second bars 11, 12, and another end connected pivotally to one of the third and fourth bars 17, 18.

A retention unit is provided for limiting the sleeve 3 from moving toward the juncture of the first and second bars 11, 12 after the sleeve 3 is pulled away from the juncture against biasing action of the biasing unit 35. The retention unit includes an engaging member 39 which projects upwardly and integrally from the sleeve 3, and a retaining piece 191 which protrudes outwardly from one of the intersecting links 19. The engaging member 39 has a guide face 391, and an engaging face 393 engageable with the retaining piece 191. In this embodiment, the retaining piece 191 is a plastic piece, and is fixed on said one of the intersecting links 19 by a pin (not shown).

Figure 5:
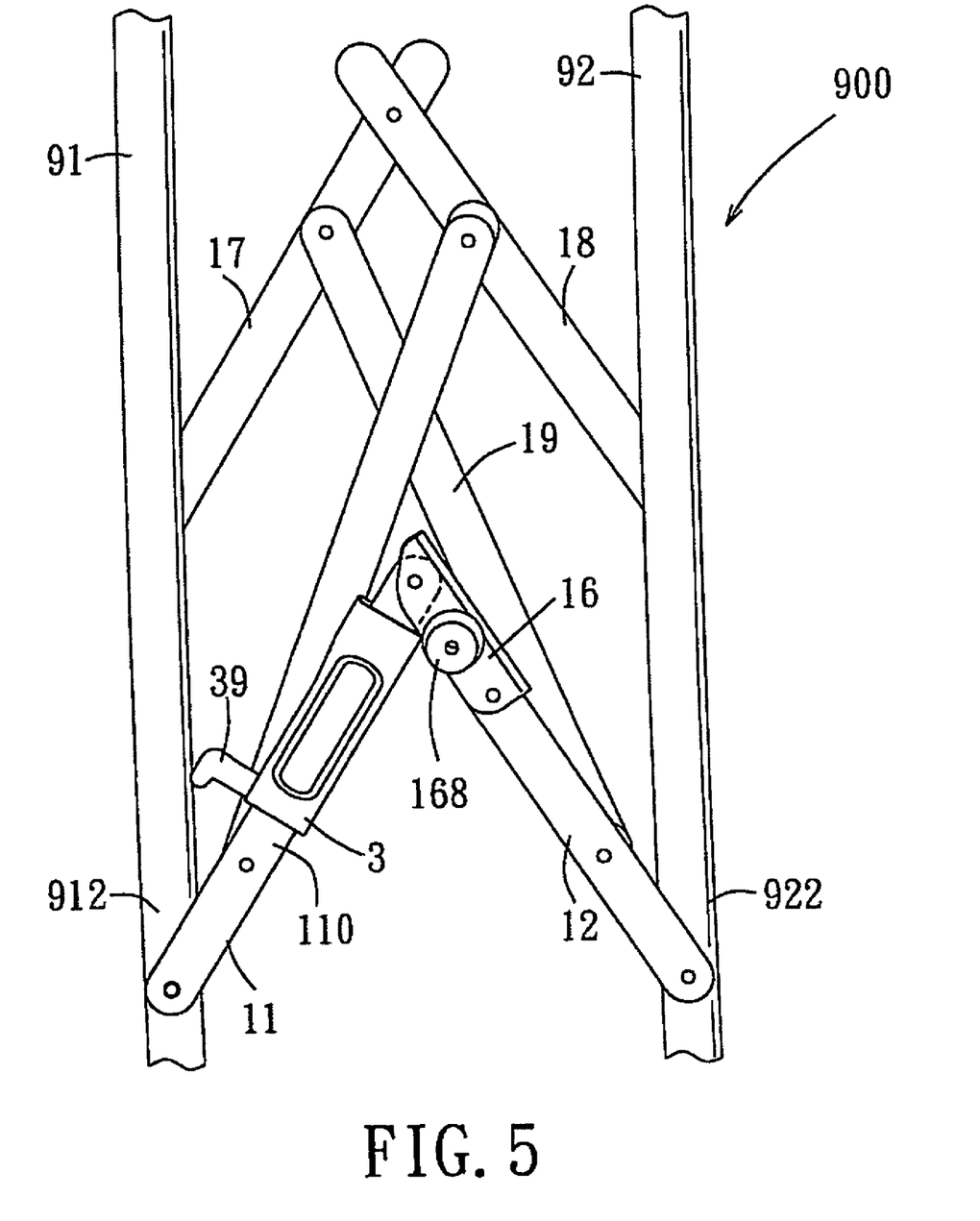
FIG. 5 is a fragmentary schematic view of the frame in a folded state.
Figure 6:
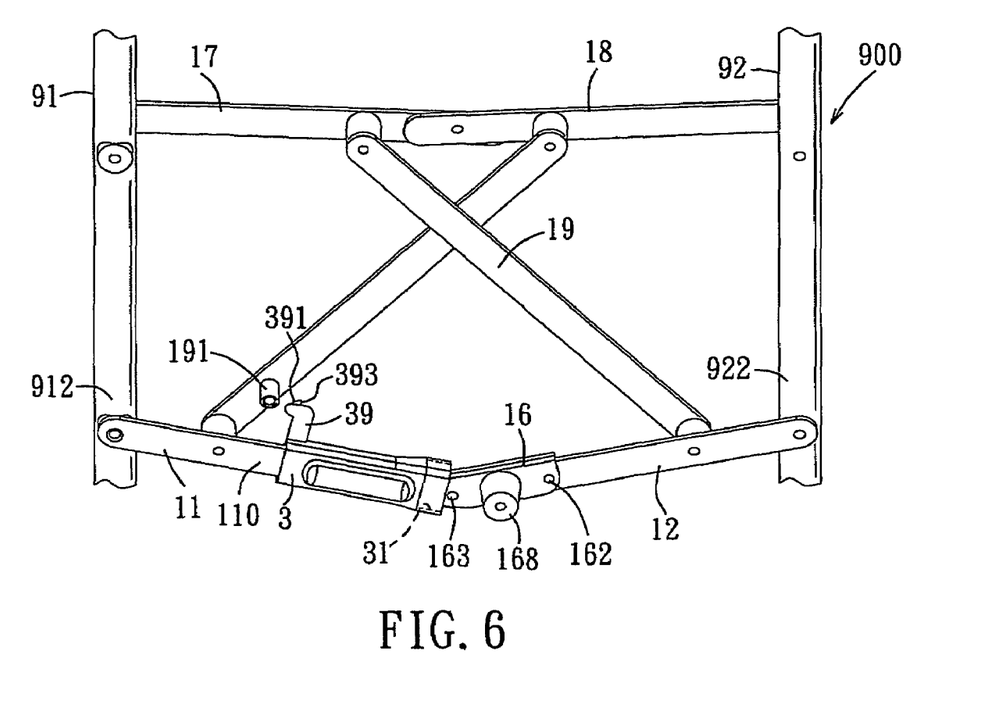
FIG. 6 is a view similar to FIG. 5, but illustrating the frame in a fully unfolded state.
Figure 7:
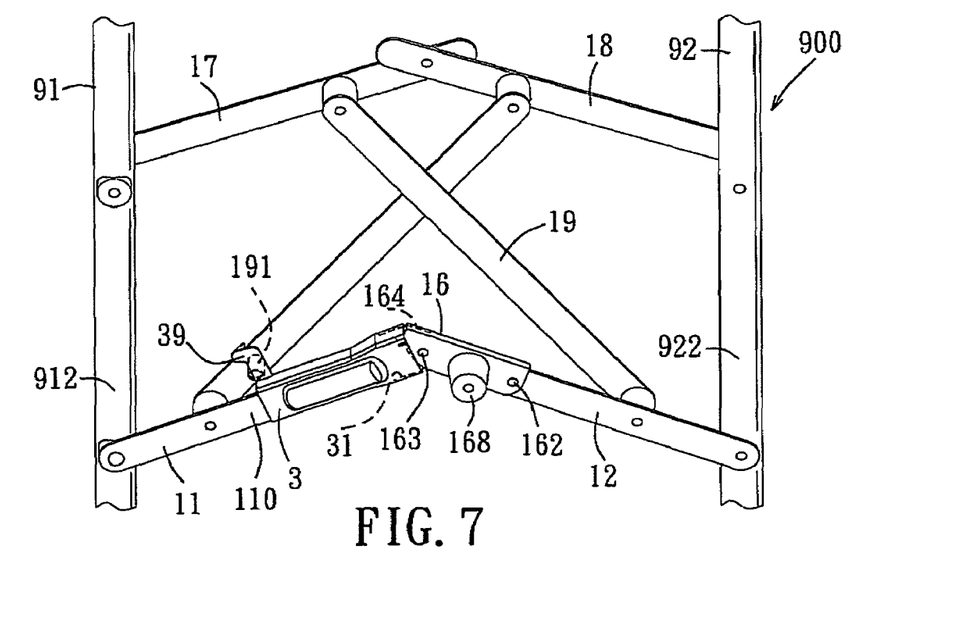
FIG. 7 is a view similar to that of FIG. 5, but illustrating the frame in an initially expanded state.

Referring to FIG. 5, when the stroller is to be used, that is, when the foldable frame 900 is to be converted from a folded state shown in FIG. 5 to an unfolded state shown in FIG. 6, the frame 900 is first placed in an initial expanded position shown in FIG. 7. This is accomplished, for example, by the user applying a force on the handles 914, 924. Next, the user steps on the pedal block 168 of the limiting member 16 so as to move the first and second bars 11, 12 downwardly. The first and second bars 11, 12 are moved continuously until the second end 11b of the first bar 11 engages the inner wall face 164 of the limiting member 16. The first and second bars 11, 12 are therefore prevented from pivoting further at this time.

When the first and second bars 11, 12 are stopped from pivoting, the first open end 31 of the sleeve 3 is biased by the biasing unit 35 to move to the juncture of the first and second bars 11, 12 so that the first and second bars 11, 12 are further restricted from pivoting relative to each other. In this state, if the pedal block 168 is accidentally kicked, or otherwise struck by the user or an object, the frame 900 remains unfolded, thereby preventing inadvertent folding of the frame 900.

During unfolding of the frame 900, the first and second bars 11, 12 are pulled apart to be converted from an inverted-V shape shown in FIG. 5 to a shape with a slight oblique angle formed therebetween as shown in FIG. 6.

Figure 8:
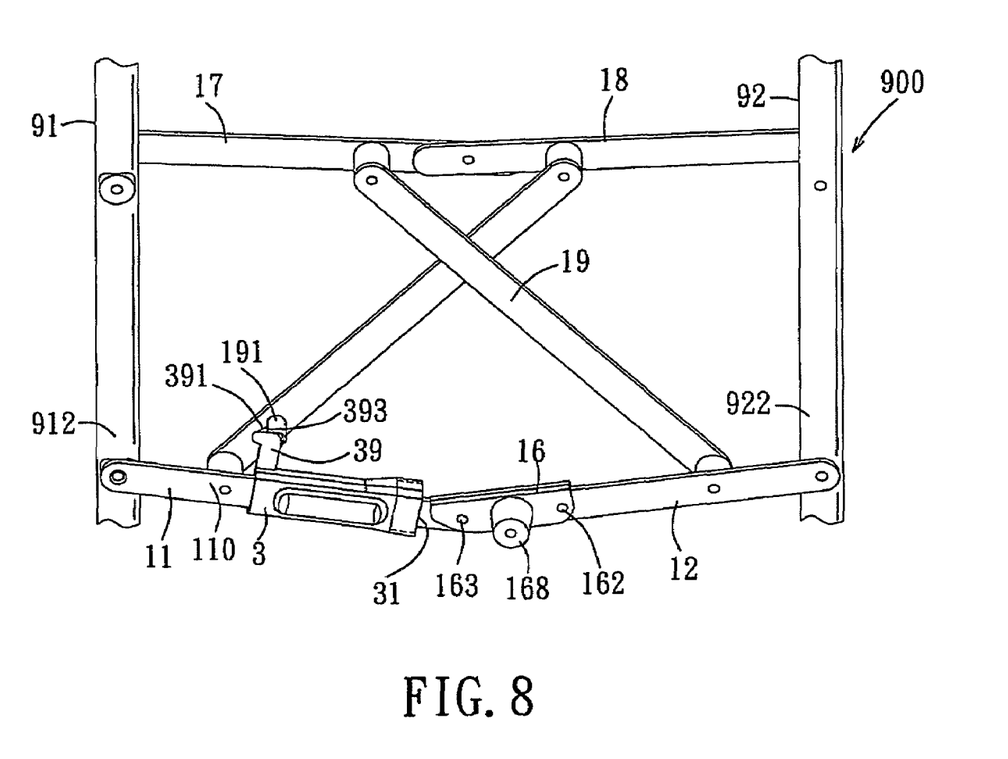
FIG. 8 is a view similar to FIG. 5, but illustrating a sleeve of the locking device in a state pulled away from a juncture of first and second bars.

When it is desired to store the stroller, the foldable frame 900 is converted from the unfolded state shown in FIG. 6 to the folded state shown in FIG. 5. To perform this operation, the user simply slides the knob 45 upwardly along the first support rod 91 so that the cable 14 pulls the sleeve 3 away from the juncture of the first and second bars 11, 12 against the biasing action of the biasing unit 35. At this time, the biasing unit 35 is compressed, and the guide face 391 of the engaging member 39 slides past the retaining piece 191 so that the engaging face 393 of the engaging member 39 can engage the retaining piece 191 (see FIG. 8), thereby preventing the sleeve 3 from moving back toward the juncture of the first and second bars 11, 12.

After the engaging face 393 of the engaging member 39 engages the retaining piece 191, the user releases his/her hold on the knob 45, and then uses his/her foot to force upwardly the pedal block 168 so that the second end 11b of the first bar 11 is disengaged from the inner wall face 164 of the limiting member 16. The user then applies a force to the handles 914, 924 in a direction toward each other such that the first and second bars. 11, 12, the third and fourth bars 17, 18, and the intersecting links 19 pivot relative to each other for folding, thereby bringing the foldable frame 900 to the folded state (see FIG. 5) and bringing the first and second support rods 91, 92 proximate to each other.

It should be noted that during folding of the foldable frame 900, the locations of the engaging face 393 and the retaining piece 191 are changed so that the engaging face 393 can disengage from the retaining piece 191. As a result, the sleeve 3 is biased by the biasing unit 35 to move toward and contact the limiting member 16.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A foldable frame comprising:
   first and second support rods which are spaced apart from each other;
   a first bar having a first end connected pivotally to said first support rod and a second end opposite to said first end;
   a second bar having a first end connected pivotally to said second support rod and a second end connected pivotally to said second end of said first bar, said first and second bars being connected pivotally to each other so as to be folded or unfolded;
   a sleeve formed as a tubular member which is disposed slidably around said first bar and movable to a juncture of said first and second bars when said first and second bars are unfolded, said tubular member being sleeved around a portion of said second bar when moved to said juncture so as to limit relative movement between said first and second bars; and
   a control unit having a cable connected to said sleeve for pulling said sleeve away from said juncture of said first and second bars so that said first and second bars can be folded.

2. The foldable frame as claimed in claim 1, wherein said second bar further includes a limiting member which is disposed on said second end of said second bar and which is engageable with said second end of said first bar to limit relative movement between said first and second bars when said first and second bars are unfolded.

3. The foldable frame as claimed in claim 2, wherein said limiting member has a substantially U-shaped cross-section and projects from said second end of said second bar to overlap said second end of said first bar, said limiting member having an inner wall face engageable with said second end of said first bar.

4. The foldable frame as claimed in claim 2, wherein said limiting member has a pedal block projecting outwardly from said limiting member and transversely of said second bar.

5. The foldable frame as claimed in claim 1, wherein said sleeve includes a biasing unit which biases said sleeve to move toward said juncture of said first and second bars.

6. The foldable frame as claimed in claim 5, further comprising a retention unit for limiting said sleeve from moving toward said juncture of said first and second bars after said sleeve is pulled away from said juncture against biasing action of said biasing unit.

7. The foldable frame as claimed in claim 6, further comprising a pair of intersecting links which are pivoted to each other between said first and second support rods, each of said intersecting links having one end connected pivotally to one of said first and second bars, said retention unit including an engaging member which projects from said sleeve, and a retaining piece which projects from one of said links, said engaging member being engageable with said retaining piece.

8. The foldable frame as claimed in claim 5, wherein said sleeve has a receiving groove for receiving said biasing unit, said biasing unit having one end connected to said sleeve and another end connected to said first bar.

9. The foldable frame as claimed in claim 1, wherein said sleeve has a socket, and a lump received in said socket and connected to said cable.

10. The foldable frame as claimed in claim 1, wherein said control unit includes a hand-operated mechanism mounted on one of said first and second support rods and connected to said cable.

11. The foldable frame as claimed in claim 10, wherein said hand-operated mechanism includes a knob which is sleeved slidably around one of said first and second support rods and which is connected to said cable, said cable being movable in unison with said knob.

12. The foldable frame as claimed in claim 11, wherein said hand-operated mechanism further includes a slide plate inserted into said one of said first and second support rods and connected to said knob, said cable being connected to said slide plate.

13. A locking device adapted to be mounted on a foldable frame, the frame having first and second support rods, said locking device comprising:
   a first bar having a first end adapted to be connected pivotally to the first support rod, and a second end opposite to said first end;
   a second bar having a first end adapted to be connected pivotally to the second support rod, and a second end connected pivotally to said second end of said first bar, said first and second bars being movable relative to each other so as to be folded or unfolded;
   a sleeve formed as a tubular member which is disposed slidably around said first bar and capable of extending toward a juncture of said first and second bars when said first and second bars are unfolded, said tubular member being sleeved around a portion of said second bar when moved to said juncture so as to limit relative movement between said first and second bars; and
   a control unit having a manually operable cable connected to said sleeve for pulling said sleeve away from said juncture of said first and second bars so that said first and second bars can be folded.

14. The locking device as claimed in claim 13, wherein said control unit includes a hand-operated mechanism mounted on one of said first and second support rods and connected to said cable.

15. The locking device as claimed in claim 14, wherein said hand-operated mechanism includes a knob which is sleeved slidably around one of said first and second support rods and which is connected to said cable, said cable being movable in unison with said knob.

16. The locking device as claimed in claim 13, wherein said sleeve includes a biasing unit which biases said sleeve to move toward said juncture of said first and second bars.

17. The locking device as claimed in claim 16, further comprising a retention unit for limiting said sleeve from moving toward said juncture of said first and second bars after said sleeve is pulled away from said juncture against biasing action of said biasing unit.

18. A locking device adapted to be mounted on a foldable frame, the frame having first and second support rods, said locking device comprising:
   a first bar having a first end adapted to be connected pivotally to the first support rod, and a second end opposite to said first end;
   a second bar having a first end adapted to be connected pivotally to the second support rod, and a second end connected pivotally to said second end of said first bar, said first and second bars being movable relative to each other so as to be folded or unfolded;
   a sleeve sleeved slidably on said first bar and capable of extending toward a juncture of said first and second bars when said first and second bars are unfolded so as to limit relative movement between said first and second bars;
   a control unit having a manually operable cable connected to said sleeve for palling said sleeve away from said juncture of said first and second bars so that said first and second bars can be folded;
   wherein said control unit includes a hand-operated mechanism mounted on one of said first and second support rods and connected to said cable; and
   wherein said hand-operated mechanism includes a knob which is sleeved slidably around one of said first and second support rods and which is connected to said cable, said cable being movable in unison with said knob.

* * * * *